United States Patent
Fujieda et al.

(10) Patent No.: US 11,803,179 B2
(45) Date of Patent: Oct. 31, 2023

(54) SCADA WEB HMI SYSTEM

(71) Applicant: Toshiba Mitsubishi-Electric Industrial Systems Corporation, Tokyo (JP)

(72) Inventors: Hiroyuki Fujieda, Tokyo (JP); Nobuo Shimizu, Tokyo (JP); Akira Nojima, Tokyo (JP); Ryo Shimizu, Tokyo (JP); Takaharu Hashizume, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 406 days.

(21) Appl. No.: 16/961,698

(22) PCT Filed: Oct. 31, 2018

(86) PCT No.: PCT/JP2018/040510
§ 371 (c)(1),
(2) Date: Jul. 13, 2020

(87) PCT Pub. No.: WO2020/090033
PCT Pub. Date: May 7, 2020

(65) Prior Publication Data
US 2021/0373546 A1 Dec. 2, 2021

(51) Int. Cl.
*G05B 23/02* (2006.01)
*G06F 16/957* (2019.01)
*G05B 19/05* (2006.01)

(52) U.S. Cl.
CPC ......... *G05B 23/0272* (2013.01); *G05B 19/05* (2013.01); *G05B 23/0216* (2013.01); *G06F 16/957* (2019.01); *G05B 2219/24215* (2013.01)

(58) Field of Classification Search
CPC ............... G05B 23/0272; G05B 19/05; G05B 23/0216; G05B 2219/24215;
(Continued)

(56) References Cited

U.S. PATENT DOCUMENTS 7,813,822 B1 * 10/2010 Hoffberg ................. H04N 7/163
381/73.1
8,316,237 B1 * 11/2012 Felsher ................. H04L 9/3249
380/282
(Continued)

FOREIGN PATENT DOCUMENTS

AU 2014358019 A1 * 3/2016 ........... G06F 3/0346
CA 2452460 C * 4/2011 ............. G06F 9/451
(Continued)

OTHER PUBLICATIONS

Office Action dated Jul. 1, 2021, in corresponding Indian patent Application No. 202017031435, 5 pages.
(Continued)

*Primary Examiner* — Steven P Sax
(74) *Attorney, Agent, or Firm* — XSENSUS LLP

(57) ABSTRACT

A SCADA Web HMI system includes a drawing generation device (1) and an HMI terminal device (32). A drawing editor (11) generates SVG data (21) and part runtime attribute data (22). The HMI terminal device (32) includes a Web browser (321) that reads SVG data (21) and displays an HMI screen, and an HMI Web runtime (322) that reads the part runtime attribute data (22) as setting parameters and operates on the Web browser (321). When receiving signal data corresponding to unique signal names from a monitoring target device (7), the HMI Web runtime (322) changes display of parts corresponding to the unique signal names on the HMI screen.

8 Claims, 13 Drawing Sheets

(58) Field of Classification Search
CPC ......... G05B 2219/23067; G06F 16/957; G06F 3/04842; G06F 3/04845; G06F 3/04817; G06F 3/0486; G06F 3/147; G01N 27/12; H01C 13/02; H04L 63/12; H04L 67/12; H04L 67/01; Y02P 90/02; G09G 5/363; G09G 2370/20; G06Q 50/06

See application file for complete search history.

(56) References Cited

U.S. PATENT DOCUMENTS

| | | | | |
|---|---|---|---|---|
| 10,480,980 | B2* | 11/2019 | Smith | G01D 4/002 |
| 10,663,960 | B2* | 5/2020 | Bayat | G05B 23/0272 |
| 10,761,509 | B2* | 9/2020 | Wang | G05B 19/409 |
| 10,871,768 | B2* | 12/2020 | Zhang | G06Q 50/06 |
| 11,252,175 | B2* | 2/2022 | Hassanzadeh | G06F 21/56 |
| 11,644,810 | B2* | 5/2023 | Fujieda | G06F 3/147 |
| | | | | 345/520 |
| 11,650,575 | B2* | 5/2023 | Sundaram | G05B 19/4185 |
| | | | | 700/9 |
| 2008/0154393 | A1 | 6/2008 | Reshef | |
| 2010/0057265 | A1 | 3/2010 | Szemkus | |
| 2013/0110895 | A1* | 5/2013 | Valentino | G09B 19/00 |
| | | | | 708/255 |
| 2015/0363481 | A1* | 12/2015 | Haynes | G06Q 10/10 |
| | | | | 707/748 |
| 2017/0070400 | A1* | 3/2017 | Minami | G06F 3/0632 |
| 2017/0228502 | A1* | 8/2017 | Rickard | G16H 10/60 |
| 2017/0286068 | A1* | 10/2017 | Shiokawa | G06F 8/36 |
| 2017/0315697 | A1* | 11/2017 | Jacobson | H04L 12/281 |
| 2018/0364898 | A1* | 12/2018 | Chen | G06F 3/0483 |
| 2019/0346390 | A1* | 11/2019 | Lettow | G01N 27/12 |

FOREIGN PATENT DOCUMENTS

| | | | | | |
|---|---|---|---|---|---|
| CA | 2319586 | C | * | 1/2012 | ............ G05B 19/00 |
| CA | 2462212 | C | * | 4/2012 | ......... H04L 63/0267 |
| CA | 2824330 | A1 | * | 7/2012 | ........... G01S 3/7864 |
| CA | 2836813 | A1 | * | 11/2012 | .............. G06F 3/011 |
| CA | 3039347 | A1 | * | 4/2018 | ......... G02B 27/0093 |
| CA | 2862080 | C | * | 8/2020 | ........... G06F 3/0482 |
| CA | 3001304 | C | * | 10/2021 | ........... G06F 16/254 |
| CA | 2862992 | C | * | 11/2021 | ......... G06F 3/04817 |
| CA | 2877307 | C | * | 12/2021 | ............. G05B 15/02 |
| CA | 2986596 | C | * | 4/2023 | ........... H04L 41/085 |
| CN | 106354105 | A | * | 1/2017 | ......... G05B 19/4185 |
| CN | 107229462 | A | | 10/2017 | |
| JP | 2004501427 | A | * | 1/2004 | |
| JP | 2004326537 | A | * | 11/2004 | |
| JP | 2017-27211 | A | | 2/2017 | |
| JP | 2017-62635 | A | | 3/2017 | |
| JP | 2017135460 | A | * | 8/2017 | ......... H04L 65/1069 |
| VN | 10031782 | B | * | 5/2022 | ............. F01K 13/02 |
| WO | WO-2009046095 | A1 | * | 4/2009 | ......... G05B 23/0267 |
| WO | WO-2016137845 | A1 | * | 9/2016 | ......... G06F 3/04842 |

OTHER PUBLICATIONS

International Search Report and Written Opinion dated Jan. 15, 2019 for PCT/JP2018/040510 filed on Oct. 31, 2018, 6 pages including English Translation of the International Search Report.

Office Action dated Nov. 19, 2019 for Taiwanese Patent Application No. 107145260, 7 pages (with partial English translation).

* cited by examiner

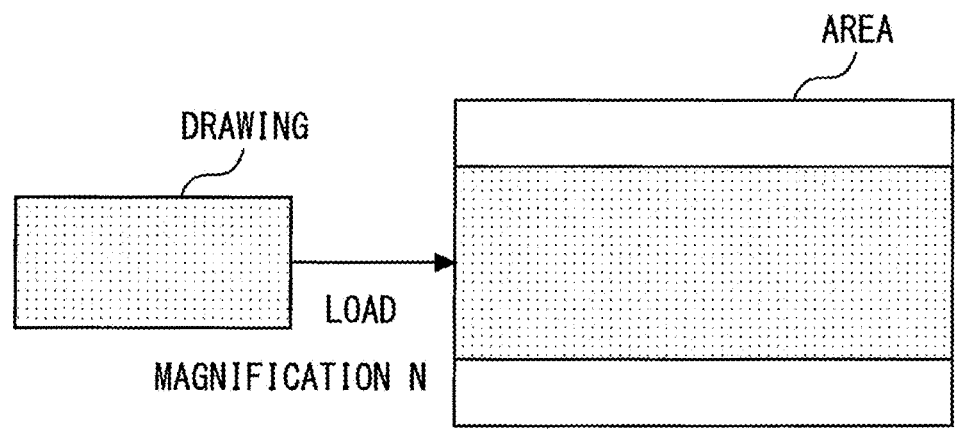
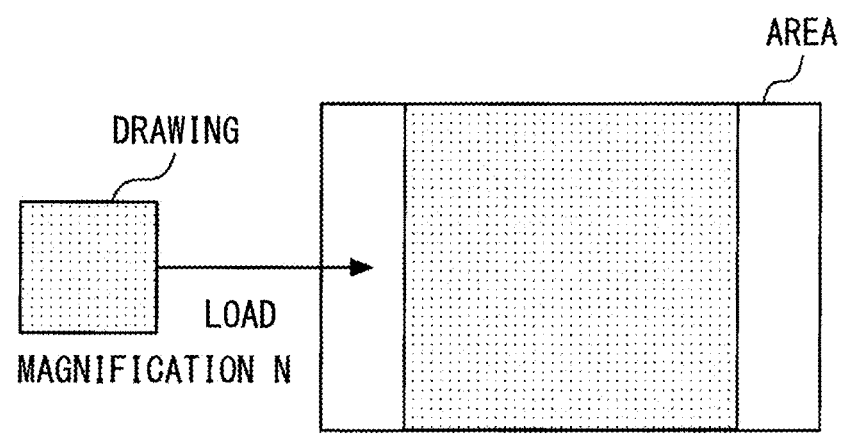
FIG. 9

|  | DRAWING | SVG view box | AREA view port | DRAWING ON AREA |
|---|---|---|---|---|
| RESOLUTION | 96dpi | 72dpi |  | r |
| IMAGE SIZE (pixel) | (gw, gh) | (vbw, vbh) =(gw*72/96, gh*72/96) | (vpw, vph) | (vbw*n, vbh*n) n=min(vpw/vbw), vph/vbh) |
| APPARENT SIZE (inch) | (gw/96, gh/96) |  |  | (vpw/r, vph/r) (WHEN ASPECT RATIOS OF DRAWING AND AREA ARE THE SAME) |

FIG. 11

SCADA WEB HMI SYSTEM

CROSS-REFERENCE TO RELATED APPLICATION

The present application is based on PCT filing PCT/JP2018/040510, filed Oct. 31, 2018, the entire contents of which are incorporated herein by reference.

FIELD

The present invention relates to SCADA HMI, and more particularly, to a SCADA Web HMI system in which SCADA HMI operates on a Web browser.

BACKGROUND

SCADA (Supervisory Control And Data Acquisition) is known as a mechanism for monitoring and controlling a social infrastructure system. Social infrastructure systems include steel rolling systems, power transmission and transformation systems, water and sewage treatment systems, building management systems, and road systems.

SCADA is a type of industrial control system that performs computer-based system monitoring and process control. SCADA requires responsiveness (real-time performance) that matches the processing performance of the system.

SCADA generally consists of the following subsystems.
(1) HMI (Human Machine Interface)

The HMI is a mechanism that presents data of a target process (monitoring target device) to an operator so that the operator can monitor and control the process. For example, Patent Document 1 discloses a SCADA HMI having an HMI screen operating on a SCADA client.
(2) Monitoring Control System A monitoring control system collects signal data on the process and sends control commands to the process. The system is composed of a PLC (Programmable Logic Controller) and others.
(3) Remote Input/Output Device (RIO)

A remote input/output device is connected to a sensor installed in the process, converts the signal of the sensor into digital data, and sends the digital data to the monitoring control system.
(4) Communication Infrastructure The communication infrastructure connects the monitoring control system and the remote input/output device.

CITATION LIST

Patent Literature

[PTL 1] Patent Literature: JP 2017-27211 A

SUMMARY

Technical Problem

Issues in developments of the HMI subsystems, which is one of subsystems described above, will be described.

SCADA is developed based on an order from a system operator. A SCADA manufacturer designs an HMI screen and drawings based on the required specifications from an orderer (user), and confirms with the orderer whether or not there is any discrepancy between the HMI screen and the drawings and those in the required specifications, and then adjusts them. The screen is configured by combining a plurality of drawings. A general-purpose drawing editor is used for designing a screen and a drawing. The general-purpose drawing editor is, for example, MicrosoftVisio® and has an advanced drawing editing function.

Conventionally, SCADA manufacturers develop the HMI subsystems using an engineering tool separate from the drawing editor after the agreement of the orderer has been obtained. At this time, the electronic data generated by the drawing editor is not used, the HMI developer manually inputs new drawing data using an engineering tool based on the agreed screens and drawings. Further, the HMI developer needs to create a processing program for each part placed on the HMI screen using an engineering tool in order to demonstrate the monitoring control function of the HMI screen. Therefore, HMI development using engineering tools requires considerable effort. In order to eliminate re-entry of drawing data, it is conceivable to add a drawing editor function to the engineering tool, but it is difficult to realize an advanced drawing editing function of a drawing editor with an engineering tool. It is expected that HMI development will be more efficient by eliminating the need to re-enter drawing data and creating processing programs for each part in HMI development.

The present invention has been made to solve the above-described problems, and has as its object to provide a SCADA Web HMI system capable of efficiently developing an HMI subsystem.

Solution to Problem

In order to achieve the above object, a SCADA Web HMI system according to the present disclosure is configured as follows.

A SCADA Web HMI system according to the present disclosure includes a drawing generation device capable of generating a drawing where parts are arranged, and an HMI terminal device connected to a monitoring target device and displaying a state of the monitoring target device.

The drawing generation device includes a drafting unit, a part runtime attribute generation unit, and an HMI drawing data output unit.

The drafting unit displays a stencil area where parts are arranged and a drafting area where a drawing is drawn. The drafting unit is capable of arranging parts in the stencil area selected by a developer on the drawing in the drafting area.

The part runtime attribute generation unit automatically generates part runtime attribute data that associates unique names (unique signal names) associating the parts arranged on the drawing in the drafting area with the monitoring target device, with dynamic display contents of the parts depending on the change in signal data from the monitoring target device. Preferably, part runtime attribute generation unit automatically generates part runtime attribute data when the parts are arranged on the drawing in the drafting area.

The HMI drawing data output unit outputs vector data of the drawing where the parts drawn in the drafting area are arranged, and the part runtime attribute data.

The HMI terminal device includes a Web browser and an HMI web runtime.

The Web browser reads the vector data expressing at least one drawing and displays an HMI screen. The HMI screen is configured by combining a plurality of drawings defined by the vector data.

The HMI Web runtime reads the part runtime attribute data as setting parameters of a script prepared in advance and operates on the Web browser. The HMI Web runtime is a library in which the specific processing content is predetermined for each part type, and one part on the HMI screen is specified based on the read setting parameter, and performs processing unique to this part. That is, even for parts of the same type, each part has a different setting parameter (for example, unique signal name), so that the operation of each part is different. The HMI Web runtime associates the parts with the monitoring target device in accordance with the setting parameters. Also, when receiving signal data corresponding to a unique signal name from the monitoring target device, the HMI Web runtime changes the display of the part corresponding to the unique signal name in accordance with the setting parameter, on the HMI screen.

According to one preferable aspect, the HMI screen is configured by a plurality of areas, and the vector data of the drawing generated by the drawing editor is arranged in each area. The Web browser resizes the drawing to be displayed in each area configuring the HMI screen so that a long side or a short side of the drawing is inscribed in an area frame and the entire drawing is arranged within the area while an aspect ratio is fixed. Here, each drawing is generated by the drawing editor so as to be resized at the same magnification.

Preferably, the vector data is Scalable Vector Graphics (SVG) format data. When vpw is defined as the number of horizontal pixels of viewport of the area, vph is defined as the number of vertical pixels of viewport of the area, vbw is defined as the number of horizontal pixels of viewbox of the drawing, and vbh is defined as the number of vertical pixels of viewbox of the drawing, the same magnification n is n=min (vpw/vbw, vph/vbh).

In another preferred embodiment, when the button part to open a new window on the HMI screen is pressed, the part unique processing unit displays the new window at a relative position specified by a unit of length from the display position of the button part. The unit of length is, for example, inch or millimeter.

Advantageous Effects of Invention

According to this disclosure, the drawing generation device can generate vector data and parts runtime attribute data of a drawing configuring an HMI screen without programming. The HMI terminal device can display the HMI screen by reading the vector data into the Web browser. Further, the HMI terminal device can operate the HMI Web runtime on the Web browser using the part runtime attribute data as the setting parameters. This allows individual parts on the HMI screen to function without programming. Therefore, the HMI developer can efficiently develop the HMI subsystem as a Web application without programming. In particular, in the development of the HMI subsystem, it is possible to promote reduction in work cost for re-inputting, programming, and debugging of drawing data.

BRIEF DESCRIPTION OF DRAWINGS

FIG. 9 is a view for explaining a method of loading a drawing into an area.

FIG. 11 is a view showing a relationship among the resolution, the image size, and an apparent size.

DESCRIPTION OF EMBODIMENTS

Figure 1:
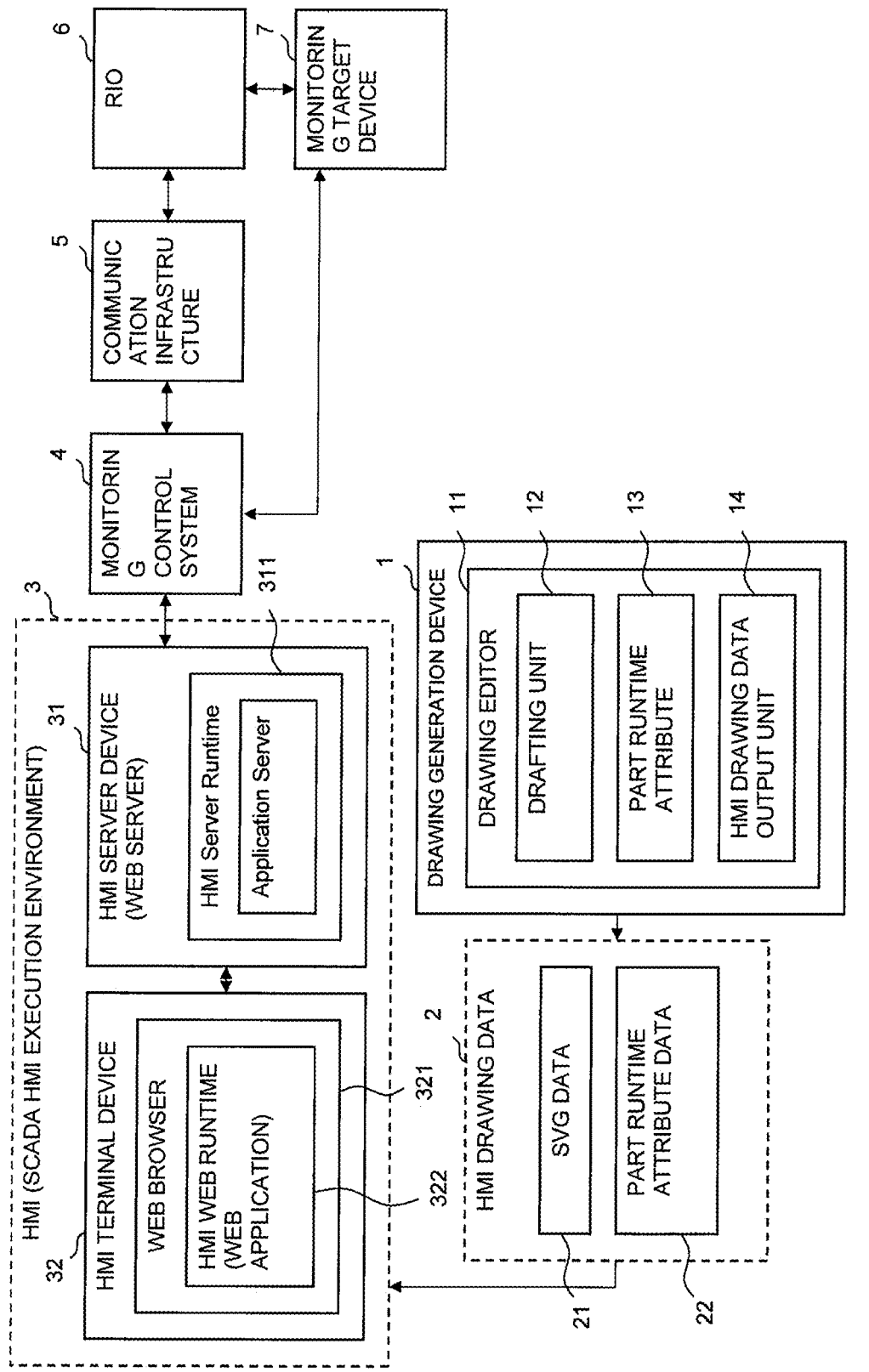
FIG. 1 is a view showing a system configuration of a SCADA.

Hereinafter, embodiments of the present disclosure will be described in detail with reference to the drawings. Note that when referring to the number, quantity, amount, range, etc. of each element in the following embodiment, unless otherwise the number is explicitly mentioned or clearly specified in principle, this disclosure is not limited to the mentioned number. Structures and the like explained in the embodiments described below are not essential to this disclosure unless explicitly mentioned or clearly specified in principle. Elements common to those in each drawing are denoted by the same reference numerals, and redundant description thereof will be omitted.

First Embodiment

<Overall System>

FIG. 1 is a view showing a system configuration of a SCADA. SCADA includes an HMI 3, a monitoring control system 4, a communication infrastructure 5, and a RIO 6 as subsystems, and is connected to a monitoring target device 7. In this specification, the HMI 3 as a SCADA HMI execution environment, and a drawing generation device 1 as a SCADA HMI development environment are collectively referred to as a SCADA Web HMI system.

Descriptions on the monitoring control system 4, the communication infrastructure 5, and the RIO 6 are the same as those described in the background, and thus will be omitted. The monitoring target device 7 is a sensor, an actuator, or the like that configures a plant to be monitored and controlled.

A drawing generation device 1 includes a drawing editor 11. The drawing generation device 1 which is a development environment generates HMI drawing data 2 by the drawing editor 11. The HMI drawing data 2 includes: SVG (Scalable Vector Graphics) data 21 which is vector data; and part runtime attribute data 22.

The HMI 3 (HMI subsystem) includes an HMI server device 31 and an HMI terminal device 32. In the HMI 3 as the execution environment, an HMI Web runtime 322 (Web application) operating on the Web browser 321 by reading the HMI drawing data 2 and an HMI Server runtime 311 cooperate to operate as an HMI subsystem.

<Drawing Generation Device>

The drawing editor 11 included in the drawing generation device 1 has an advanced drawing editing function and a function of saving drawing data in an SVG format. The drawing editor 11 is MicrosoftVisio®, as an example.

Figure 2:
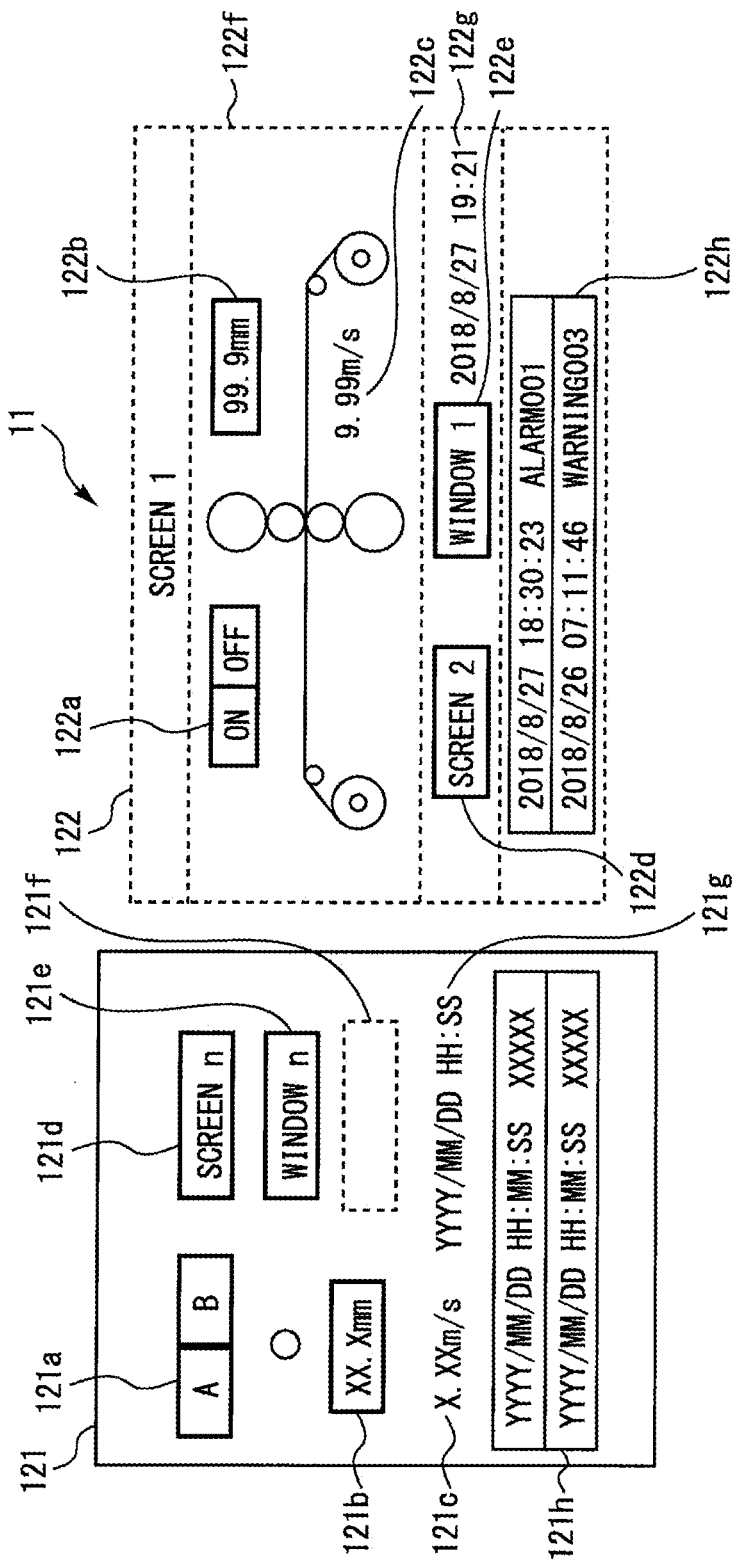
FIG. 2 is an example of a drawing generation screen displayed by a drawing editor.

The drawing editor 11 operating on the drawing generation device 1 includes: a drafting unit 12; a part runtime attribute generation unit 13; and an HMI drawing data output unit 14. A drawing generation screen displayed by the drafting unit 12 will be described with reference to FIG. 2. FIG. 2 shows an example of the drawing generation screen displayed by the drawing editor 11.

Figure 6:
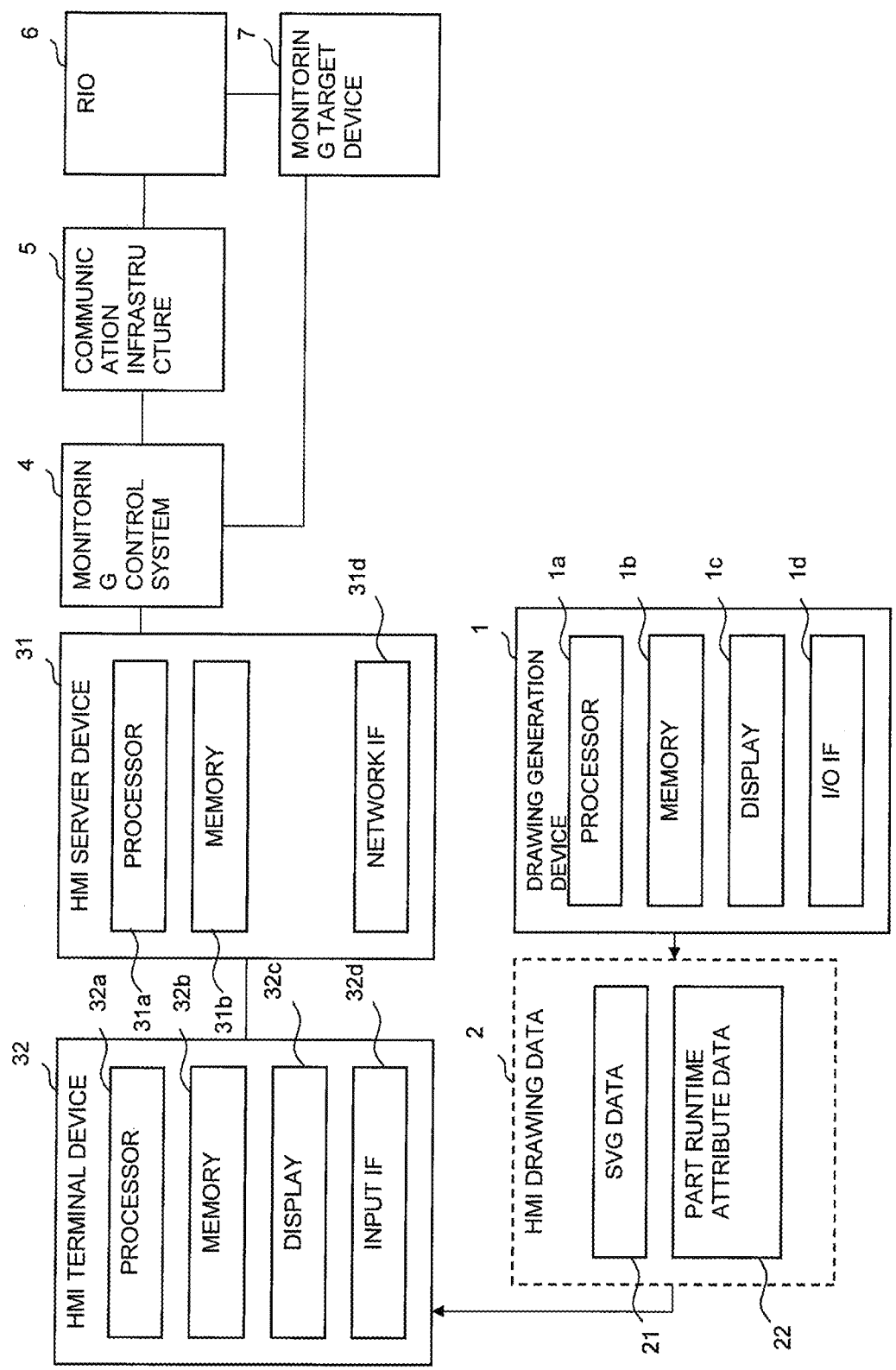
FIG. 6 is a block view illustrating an example of a hardware configuration that a SCADA Web HMI system has.

The drafting unit 12 displays side by side, on a display 1c (FIG. 6), a stencil area 121 in which prototypes of parts necessary for generating a drawing are arranged, and a drafting area 122 where a drawing is drawn. Further, the drafting unit 12 can arrange parts on the stencil area 121 selected by a developer on the drawing in the drafting area 122 by using an input/output interface 1d (FIG. 6).

In the example of FIG. 2, in the stencil area 121, a prototype 121a of a DI (Digital Input)/DO (Digital Output) signal part, a prototype 121b of an AI (Analog Input)/AO (Analog Output) signal part, and a prototype 121c of an AI signal part, a prototype 121d of a drawing button part, a prototype 121e of a window display part, a prototype 121f of an area part, a prototype 121g of a clock part, and a prototype 121h of an alarm message list are displayed. To supplement, the reference numeral 121a is a push button with a lamp, which includes a DI for a lamp display and a DO for a button operation.

The types of parts are not limited to these, and typical parts include a DO (Digital Output) signal part, an AO (Analog Output) signal part, a drawing switching part, an alarm button part, etc. Prototypes of these parts can also be displayed in stencil area 121.

The above-described DI signal part include different types such as a PL (a push button with lamp) and an SL (a signal lamp). The PL further includes a PL1, a PL2 (alternative choice button), and a PL3 (threefold choice button). The DI/DO signal part shown in FIG. 2 is the PL2.

The developer of the HMI screen can copy (drag and drop) parts on the stencil area 121 in FIG. 2, and arrange them at any positions on the drawing in the drafting area 122. Parts 122a to 122h in FIG. 2 are obtained as the developer copies the prototypes 121a to 121h of the parts from the stencil area 121 and arranges them on the drawing in the drafting area 122. In this way, a drawing in which the parts are arranged in the drafting area 122 is generated. Each part has a static display attribute such as a color, a shape, a position, and a size. The static display attribute can be changed on the drafting area 122.

As described above, each drawing configuring the HMI screen is generated by arranging the stencil as a part on the drawing and setting the static display attribute.

Returning to FIG. 1, the description will be continued. When a part is placed on the drawing in the drafting area 122, the part runtime attribute generation unit 13 automatically generates a part runtime attribute data unique to the concerned part. For example, when a DI signal part is arranged, the part runtime attribute generation unit 13 automatically generates part runtime attribute data that associates a unique signal name (item) for associating the concerned part with the monitoring target device 7, with a dynamic display content of the concerned part depending on the change in signal data from the monitoring target device 7.

Specifically, the signal name unique to the part is generated by combining the screen ID, the device number in the screen, and the part type. For example, for the screen ID "G1", the device number "1", and the part type "PL1A", signal names unique to the part: "G1_1PL1A_CMD" and "G1_1PL1A_SL" are generated. "G1_1PL1A_CMD" is a signal name corresponding to a control command transmitted from the HMI to the PLC. "G1_1PL1A_SL" is a signal name corresponding to signal data transmitted from the PLC to the HMI. In this way, parts are associated with signal data and control commands via signal names.

In addition, as the dynamic display content of the part, for example, when a value of the signal data changes from ON to OFF, in order to change the color of the part PL1A to an OFF color (a color different from an ON color), the color code for the OFF color is specified.

In order to perform the monitoring control function of the HMI screen, the part runtime attribute data generated for each part on the drawing is read when the HMI subsystem is executed.

The HMI drawing data output unit 14 outputs the HMI drawing data 2 including: the SVG data 21 of the drawing where the parts drawn in the drafting area 122 are arranged; and the part runtime attribute data 22. The SVG data 21 includes a static display attribute (color, shape, position, size) of the arranged parts as an attribute of SVG element.

Figure 3:
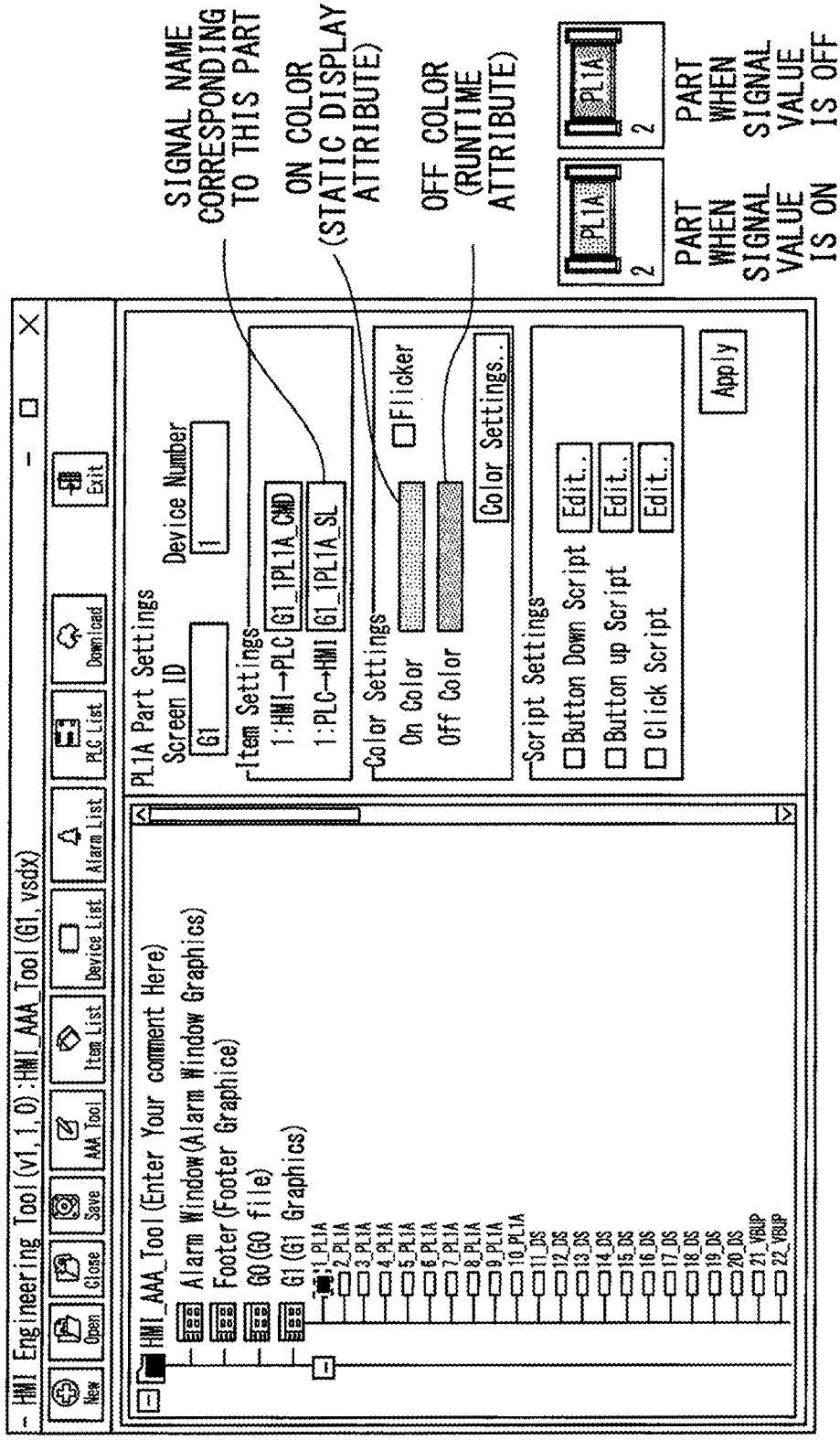
FIG. 3 is an example of an edition screen for editing part runtime attribute data.

The drawing editor 11 has a function of editing the part runtime attribute data. FIG. 3 is an example of an edition screen for editing the part runtime attribute data. For example, the part PL1A shown in FIG. 3 is associated with a value of the signal data, and a color when this value of the signal data is ON (ON color) is set as a static display attribute. In addition, a color when the value of the signal data is changed to OFF (OFF color) is set as a runtime attribute of the part. With this editing function, it is possible to change the signal name and the color code of the OFF color that are automatically generated by the part runtime attribute generation unit 13.

<HMI Terminal Device>

The HMI terminal device 32 includes a Web browser 321 and an HMI Web runtime 322 in advance.

The Web browser 321 reads at least one piece of the SVG data 21 and displays the HMI screen. The HMI screen is configured by combining a plurality of drawings defined by the vector data.

The drawing in the SVG format (SVG data 21) is read by the HMI Web runtime 322 into a DOM (Document Object Model) (not shown) managed by the Web browser 321 and drawn. When the HMI web runtime 322 changes the SVG element in the DOM in order to change the color of the part on the HMI screen, the Web browser 321 detects this change, and then updates the HMI screen.

The HMI Web runtime 322 reads the HMI drawing data 2 as setting parameters, and operates on the Web browser 321. The HMI Web runtime 322 is a library in which a processing content unique to each part type is predefined, and one part on the HMI screen is specified based on the read setting parameter, and then the HMI Web runtime 322 carries out the processing unique to the part. That is, even the parts of the same type each have different setting parameters (e.g., unique signal names), and thus each part operates differently.

Figure 4:
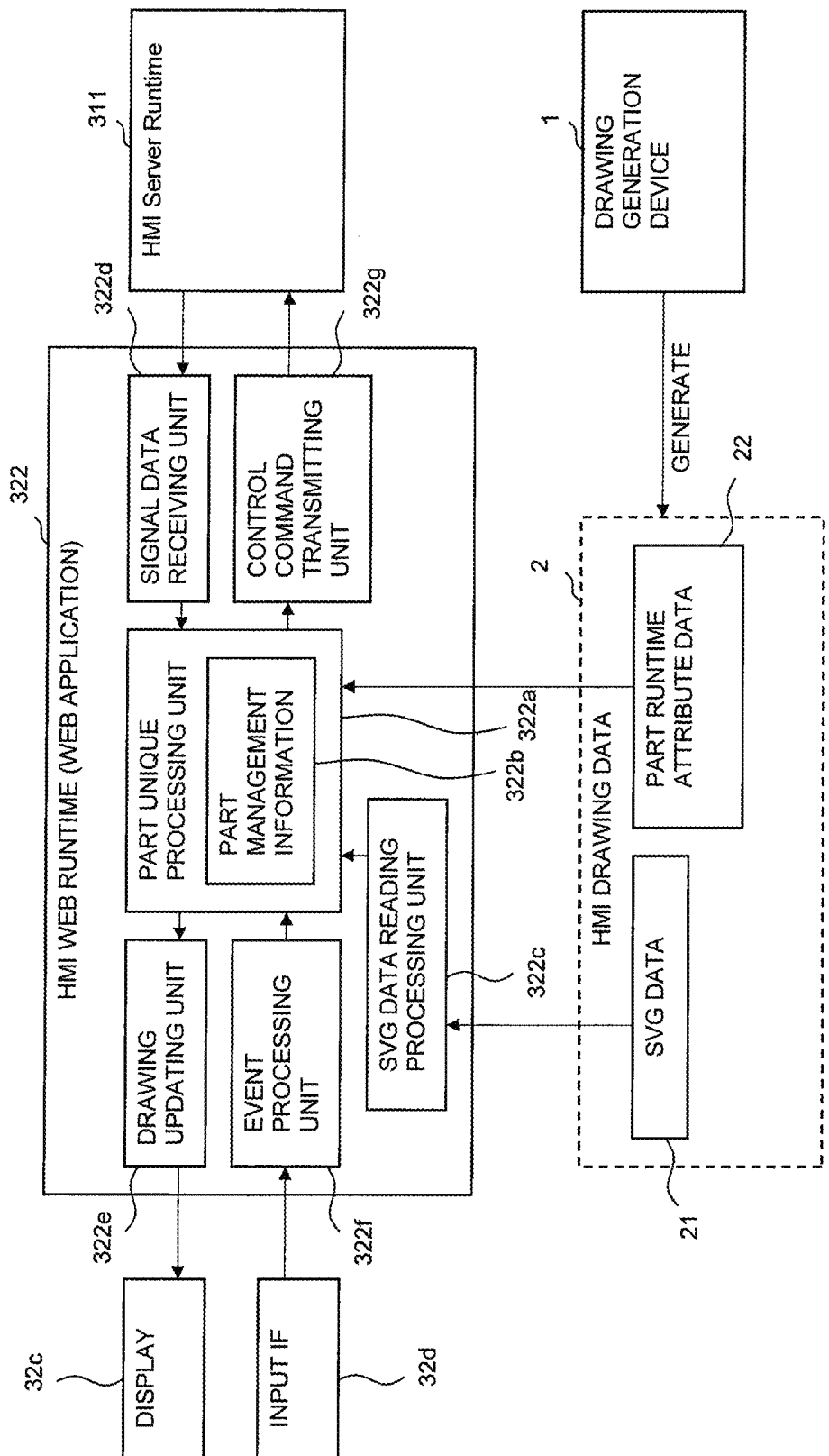
FIG. 4 is a view for explaining a configuration of an HMI web runtime operating on a Web browser of an HMI terminal device.

FIG. 4 is a view for explaining the configuration of the HMI Web runtime 322 that operates on the Web browser 321 of the HMI terminal device 32. The HMI Web runtime 322 associates parts with the monitoring target device 7 in accordance with the setting parameters. When receiving signal data corresponding to a unique signal name from the monitoring target device 7, the HMI Web runtime 322 changes the display of a part corresponding to the unique signal name in accordance with the setting parameter, on the HMI screen.

More specifically, the HMI Web runtime 322 includes a part unique processing unit 322a, an SVG data reading processing unit 322c, a signal data receiving unit 322d, a drawing updating unit 322e, an event processing unit 322f, and a control command transmitting unit 322g.

The SVG data reading processing unit 322c reads the SVG data 21. The part unique processing unit 322a includes a static display attribute of the SVG data 21 in part management information 322b. For each part included in the SVG data 21, the part unique processing unit 322a reads the part runtime attribute data 22 corresponding to the part and puts this in the part management information 322b.

The part unique processing unit 322a applies the part management information 322b as a setting parameter to a library (JavaScript® program) in which the processing content unique to each part type described later is predetermined, and causes individual parts on the HMI screen to function. For example, for the DI signal parts, the unique signal name that associates each part on the HMI screen with the monitoring target device, and a dynamic display content of the part depending on the change in the signal data corresponding to the signal name are prepared in the part management information 322b, and these are used as a setting parameter to realize the unique processing of each part.

The signal data receiving unit 322d receives signal data from the monitoring target device 7 via the HMI Server runtime 311. The part unique processing unit 322a specifies a part corresponding to the received signal data based on the part management information 322b, and determines an update instruction for the part display on the drawing. For example, the update instruction is an instruction to change a color attribute value of the SVG element in the DOM to the color code of the OFF color when a value of the signal data is OFF. This update instruction for the specified part is transmitted to the drawing updating unit 322e. The display of the specific part on the Web browser 321 displayed on the display 32c changes based on the update instruction.

In addition, the event processing unit 322f detects a keyboard or mouse event associated with each part. The part unique processing unit 322a determines a control command corresponding to the detected event based on the part management information 322b. The control command transmitting unit 322g transmits the control command to the HMI server runtime 311.

Figure 5:
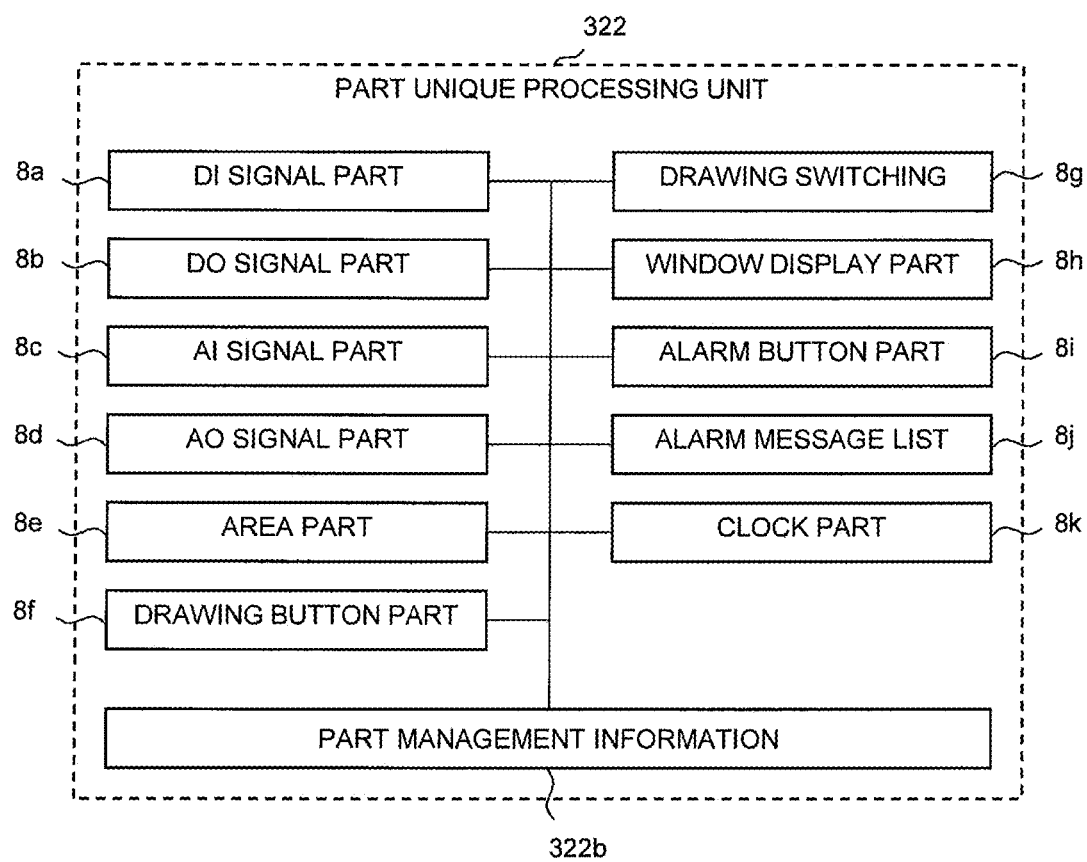
FIG. 5 is a view for explaining typical parts required for a SCADA HMI.

FIG. 5 is a view for explaining typical parts required for the SCADA HMI. In the conventional construction method of the HMI subsystem, it has been necessary to program the function of every part. On the other hand, in the SCADA Web HMI system according to the present embodiment, unique processing 8a to 8k is prepared for each part type in advance as the runtime library. Then, the program describing the unique processing for each part type can apply an attribute value in the part management information 322b as a setting parameter so as to exert the function of the concerned part. Therefore, the HMI developer can build the HMI subsystems without programming.

The DI signal part unique processing 8a receives digital signal data, and changes the display color and shape of the part in accordance with a value of the data. The run-time attribute includes a digital signal name, display color and shape when the signal is OFF.

The DO signal part unique processing 8b detects an event such as a mouse clicking, temporarily changes the display color and shape of the part, and transmits a control command. The run-time attribute includes a digital signal name, display color and shape when the data is transmitted.

The AI signal part unique process 8c receives analog signal data and displays a value in accordance with an instruction of the data display format based on the value of the signal. The run-time attribute includes an analog signal name and a display format of the data (such as "9999.99").

The AO signal part unique processing 8d processes an input from a mouse or a keyboard, generates an analog value, displays a value in accordance with an instruction of the data display format, and transmits the value. The run-time attribute includes an analog signal name and a display format of the data (such as "9999.99").

The area part unique processing 8e loads the SVG of the drawing into an area indicated by an area part. The runtime attribute includes a drawing name.

The drawing button part unique processing 8f loads the SVG of the drawing and displays this in the main area. The runtime attribute includes a drawing name.

The drawing switching part unique processing 8g displays a drawing name list, loads the SVG of a drawing selected by the operator, and displays this in the main area. The runtime attribute includes a drawing name list.

The window display part unique processing 8h generates a window at a specified position and loads the SVG of a drawing into the window. The runtime attribute includes a window position and a drawing name to be displayed in the window.

The alarm button part unique processing 8i receives an alarm message and changes the color and shape of the part in accordance with the level of the alarm. The runtime attribute includes a display color and shape of each alarm level.

The alarm message list unique processing 8j receives an alarm message and displays the alarm message in accordance with the shape of a data grid. Further, a mouse event is detected and a control command for an alarm confirmation is transmitted. The runtime attribute includes a shape of the data grid (a table displaying the data structure).

The clock part unique processing 8k acquires a current time from the system and displays the current time in a time display format on the part. The runtime attribute includes a time display format.

<HMI Server Device>

The HMI Server runtime 311 operates on the HMI server device 31. The processing of the HMI Server runtime 311 is as follows.

(1) Incorporating an application server, and supplying an HMI Web runtime content to the Web browser 321.
(2) Communicating with the monitoring control system 4 and transmitting signal data from the monitoring target device 7 to the HMI Web runtime 322, and transmitting a control command from the HMI Web runtime 322 to the monitoring control system 4.

As described above, according to the SCADA Web HMI system of the present embodiment, the drawing generation device 1 can generate the SVG data 21 and the part runtime attribute data 22 of the drawing constituting the HMI screen without programming. The HMI terminal device 32 can cause the SVG data 21 to be read into the Web browser 321, and display the HMI screen. Further, the HMI terminal device 32 can cause the HMI Web runtime 322 to operate on the Web browser 321 using the part runtime attribute data 22 as a setting parameter. With this, the individual parts on the HMI screen can be caused to function without programming. Therefore, the HMI developer can efficiently develop the HMI subsystem as a Web application without programming. In particular, in the development of the HMI subsystem, the work cost for re-inputting, programming, and debugging of drawing data can be reduced.

When creating a Web application, it is conventionally necessary to learn Web-specific technologies such as HTML, CSS, and JavaScript®. However, if this system is used, HMI developers do not need to learn such Web-specific technologies, and HMI subsystems can be built by drawing design for building the HMI and definition of the data attributes.

<Example of Hardware Configuration>

The hardware configuration of the major part of the SCADA Web HMI system will be described with reference to FIG. 6. FIG. 6 is a block diagram illustrating an example of the hardware configuration of the SCADA Web HMI system.

Each unit of the drawing generation device 1 shown in FIG. 1 shows a part of the functions that the drawing generation device 1 has, and each function is realized by a processing circuit. The processing circuit is configured by a processor 1a, a memory 1b, a display 1c, and an input/output interface 1d that are connected to each other. The input/output interface 1d is an input device such as a keyboard and a mouse, and is a device capable of outputting a file of the HMI drawing data 2. The processor 1a realizes the functions of the respective units of the drawing generation device 1 by executing the various programs stored in the memory 1b.

Each unit of the HMI terminal device 32 shown in FIG. 1 shows a part of the functions that the HMI terminal device 32 has, and each function is realized by a processing circuit. The processing circuit is configured by a processor 32a, a memory 32b, a display 32c, and an input interface 32d that are connected to each other. The input interface 32d is an input device such as a keyboard and a mouse, and is a device that can read the HMI drawing data 2. The processing circuit also includes a network device (not shown) that is connected to the HMI server device 31 and that can transmit and receive signal data and a control command. The processor 32a realizes the functions of the respective units of the HMI terminal device 32 by executing the various programs stored in the memory 32b.

Each unit of the HMI server device 31 shown in FIG. 1 shows a part of the functions of the HMI server device 31, and each function is realized by a processing circuit. The processing circuit is configured by a processor 31a, a memory 31b, and a network interface 31d that are connected to each other. The network interface 31d is a device that connects the monitoring control system 4 and the HMI terminal device 32 and that can transmit and receive signal data and a control command. The processor 31a realizes the functions of the respective units of the HMI server device 31 by executing the various programs stored in the memory 31b.

Second Embodiment

Next, the second embodiment of the present disclosure will be described with reference to FIG. 7 to FIG. 13. In the above-described SCADA Web HMI system according to the first embodiment, the HMI screen displayed on the Web browser 321 (FIG. 1) includes the plurality of areas, and vector data of a drawing generated by the drawing editor 11 is arranged in each area.

Figure 7:
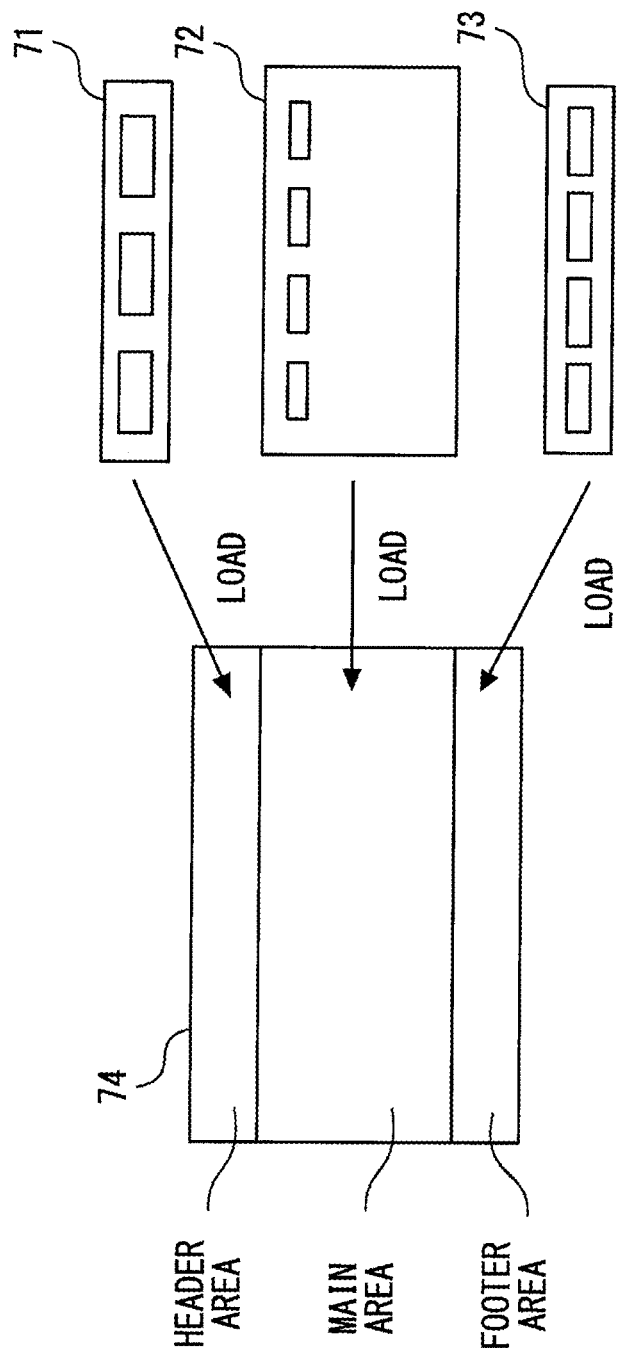
FIG. 7 is a view for explaining a configuration of an HMI screen.

A specific configuration of the HMI screen will be described with reference to FIG. 7. The HMI screen is configured by combining a layout drawing 74 in addition to a header drawing 71, a main drawing 72, and a footer drawing 73. The layout drawing 74 is a drawing including three area parts: a header area, a main area, and a footer area, and defines the layout of the HMI screen. To each area part, a drawing name to be read into this area is specified as a part runtime attribute. The HMI Web runtime 322 (FIG. 1) first reads the layout drawing 74 on the Web browser 321 (FIG. 1), and loads the SVG data of the drawings 71 to 73 corresponding to the three area parts constituting the layout drawing 74, to thereby generate an HMI screen (FIG. 5, the area part 8e). Note that area parts in which status drawings are arranged may be added to the area parts constituting the layout drawing 74.

A problem in the case in which the HMI screen is displayed on the Web browser 321 will be described. In the following description, it is assumed that the HMI screen is configured by loading SVG data of a drawing on the layout drawing 74 having three areas as shown in FIG. 7. It is assumed that parts of the same type (for example, DI signal parts) are arranged in the header drawing 71, the main drawing 72, and the footer drawing 73 that are loaded in the respective areas.

Figure 8:
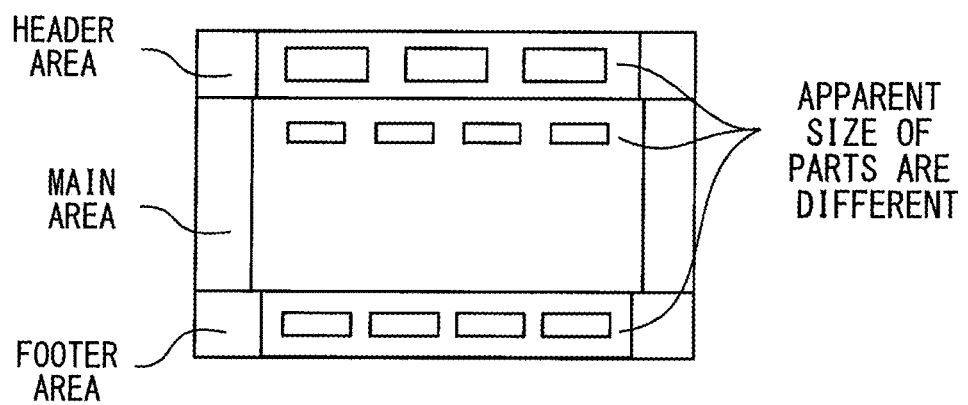
FIG. 8 is a display example of the HMI screen when each drawing is loaded into a corresponding area in a layout drawing.

FIG. 8 is a display example of the HMI screen when each drawing is loaded into its corresponding area in the layout drawing 74. The Web browser 321 resizes (inscribedly resize) the drawing to be displayed in each area configuring the HMI screen so that the long side or the short side of the drawing is inscribed in the area frame and the entire drawing is arranged within the area while the aspect ratio is fixed, for displaying.

In the above displaying, if individual drawings are generated by the drawing editor 11 without setting any rule for the size of a drawing, inconsistency is caused among the apparent sizes of the parts on the HMI screen. As shown in FIG. 8, although the same type of parts are arranged on the header drawing 71, the main drawing 72, and the footer drawing 73, the apparent sizes of these parts are displayed differently among the respective drawings.

Therefore, in order to display an HMI screen with consistency, in the present embodiment, a certain rule is provided for the size of a drawing generated by the drawing editor 11 so that each drawing is resized at the same magnification n.

In a drawing in the SVG format, the size of an image of the drawing is represented by a definition of viewbox. On the other hand, when an area is displayed on the screen, the size of an image of the area is represented by a definition of viewport. The units of vertical and horizontal lengths of both viewbox and viewport are all pixels.

When loading the drawing into the area in the layout drawing 74, the drawing in SVG format is scaled up or down so that the viewbox of the drawing fits exactly within the viewport of the area. When the sizes of the images of the area and the drawing have inconsistent aspect ratios, their images are scaled up or down at the following ratio n, and then are loaded. This n is referred to as a viewport/viewbox ratio.

$$n = \min(vpw/vbw, vph/vbh)$$

where
vpw: horizontal size of viewport in the area [pixel]
vph: vertical size of viewport in the area [pixel]
vbw: horizontal size of viewbox in the drawing [pixel]
vbh: vertical size of viewbox in the drawing [pixel]

Even when the area and the drawing have inconsistent aspect ratios of the sizes of their images, the aspect ratio of the drawing is not changed. Therefore, as shown in FIG. 9, when the loaded drawing is horizontally longer than the area, blank spaces are generated at the top and the bottom, and when the loaded drawing is vertically longer than the area, blank spaces are generated at the left and the right.

When the layout drawing 74 is actually displayed on the display 32*c*, each area in the layout drawing 74 has its apparent size on the display 32*c*, and the unit thereof is inch. A value obtained by dividing the size (pixel) of the image of the area by the size of the apparent size (inch) is a resolution of this area, and is expressed in a unit of dpi. The resolution of the area displayed on the same display coincides with the resolution of the display.

Figure 10:
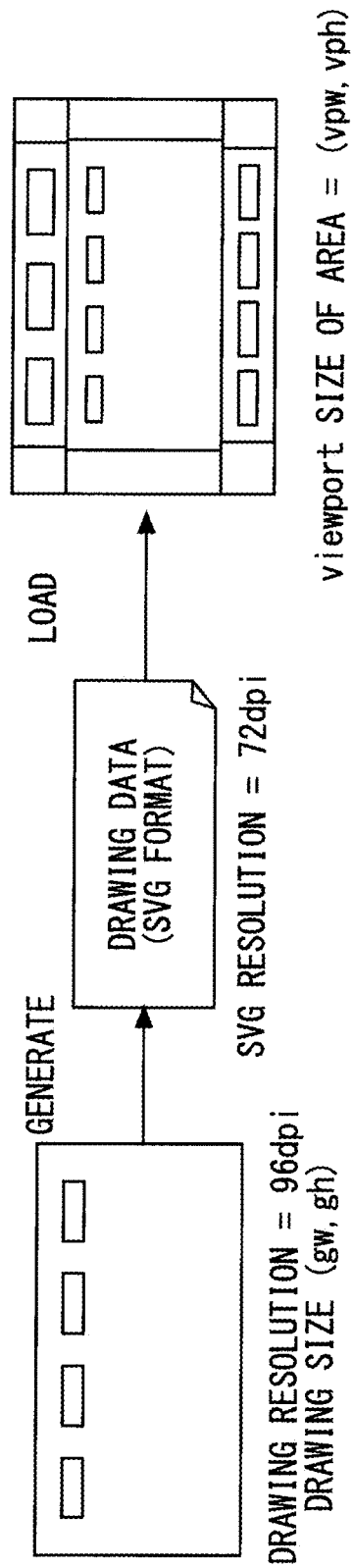
FIG. 10 is a view for explaining a drawing resolution, an SVG resolution, and an image size in an area.

A drawing represented in the SVG also has a resolution, and the resolution of the SVG generated by MicrosoftVisio® is 72 dpi. The drawing represented in the SVG can be scaled up and down, so that this drawing does not actually have an apparent size; however, a recommended apparent size of the SVG is determined based on the resolution of 72 dpi. The resolution of the drawing when the drawing is edited with MicrosoftVisio® is set to 96 dpi (FIG. 10).

When the drawings are loaded into the respective areas of the layout drawing, in order to set the apparent sizes of the parts included in the drawings to be constant, the viewport/viewbox ratio n must be kept constant in each drawing. For example, if the resolution of the display used in practice of the SCADA HMI is r[dpi], the size of the image in the area is (vpw, vph), the size of the viewbox of the SVG is (vbw, vbh), and the size of the drawing is (gw, gh), the relationship among the resolution, the size of the image, and the apparent size is as shown in FIG. 11.

From this relationship, when the design of the drawing (the layout drawing 74) and the resolution of the display 32*c* to be practiced are determined, the apparent size of each drawing generated by MicrosoftVisio® is determined. For example, when using a 26-inch display with FullHD, the horizontal length has 1920 pixels in about 22.6 inches; thus, it is about 85 dpi.

Therefore, when this display is used, the apparent size loaded into each area in the layout drawing 74 is as follows.

When the drawing is horizontally longer relative to the area:
apparent horizontal size of the drawing=vpw/85 [inch].
When the drawing is vertically longer relative to the area:
apparent vertical size of the drawing=vph/85 [inch].

By generating the drawing with MicrosoftVisio® in this apparent size, the size of the drawing displayed on the screen of the HMI 3 is consistent to the apparent size generated with MicrosoftVisio®, and thus it becomes a well-balanced drawing.

<Display of New Window>

Figure 12:
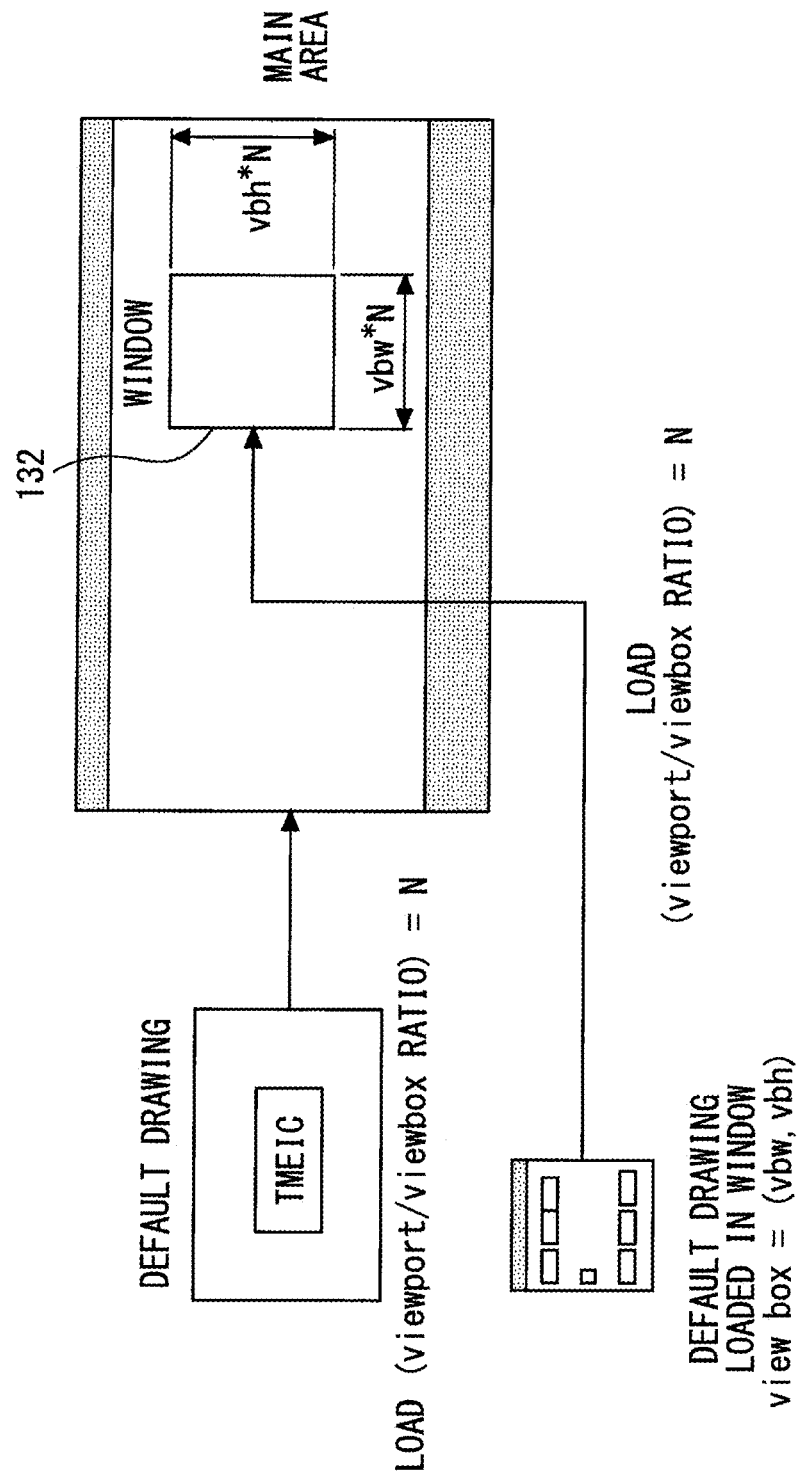
FIG. 12 is a view for explaining a resolution adjustment logic when a new window is opened and an SVG is loaded.

Next, the case in which a new window is displayed on the HMI screen will be described. FIG. 12 is a view for explaining the resolution adjustment logic when a new window 132 is opened and SVG is loaded.

A window does not have a fixed size like an area, so it is necessary to adjust the size of the window according to the drawing loaded in the window. The resolution of the drawing in the window is adjusted based on the viewport/viewbox ratio of the drawing loaded in the main area. The drawing first loaded in the main area is called a default drawing. The viewport/viewbox ratio of the default drawing is defined as N. It is assumed that the size of the viewbox of the drawing loaded in the window is (vbw, vbh), the size of the new window 132 is (vbw*N, vbh*N).

Figure 13:
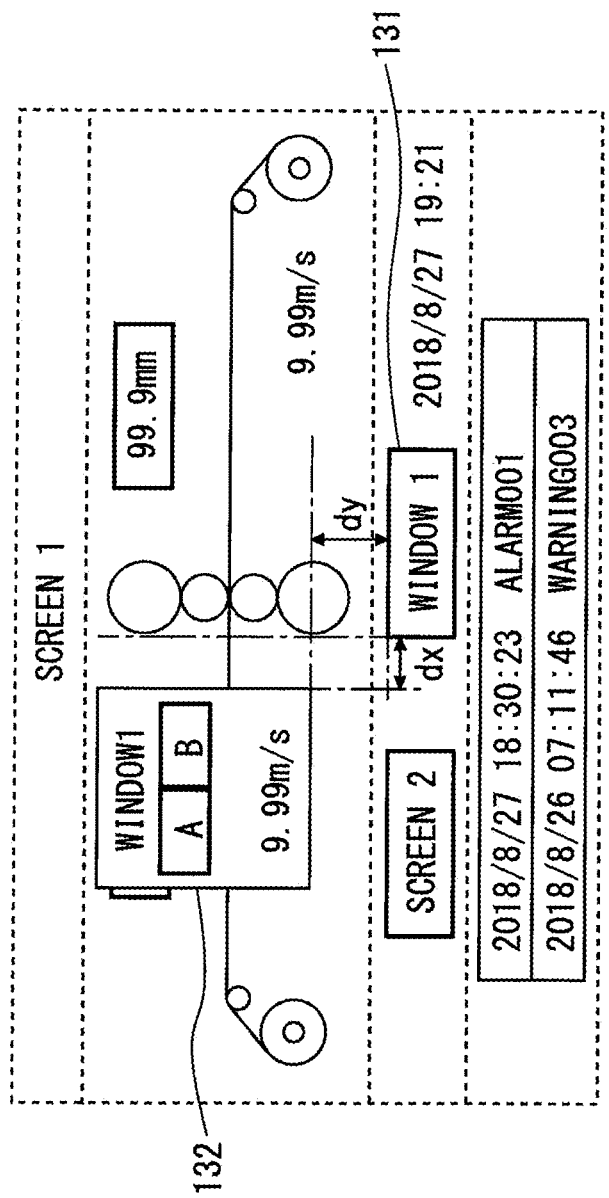
FIG. 13 is a view for explaining a display position of a window on the HMI screen.

With reference to FIG. 13, this is a view for describing a display position of a new window displayed on the HMI screen. When the button part 131 to open a new window on the HMI screen is pressed, the part unique processing unit 322*a* displays the new window 132 at a relative position specified in length unit from the display position of the button part (FIG. 5, the window display part 8*h*).

The display position of the window is specified as a runtime attribute of the window display part 8*h*, and is specified by relative position coordinates (dx, dy) in inches or millimeters. Therefore, even in the case in which the resolutions of displays used are different from each other and the resolutions of the drawings displayed are also different from each other, the relative positions of the respective windows are consistent.

In order to display a new window in the above manner, the developer of the HMI drawing follows the following drawing method.

(1) At 96 dpi, a default drawing is drawn in the same size as an apparent size thereof on the HMI screen.

(2) At 96 dpi, drawings desired to be displayed at the same resolution as that of a default drawing (drawings in a header, a footer, a window, etc.) are drawn in the same size as the apparent size on the HMI screen.

(3) The window position is specified by relative position coordinates (in inches or millimeters) in the drawing.

As a result, the drawings in the header, the footer, and the windows are all displayed at a consistent resolution within the HMI screen, independent from the resolution of the display used, and the parts in the HMI screen are also displayed in the same size as that at the time of the stencil designing.

In a Web application, since a drawing exists on the DOM as an SVG element, this can be easily scaled up and down. The HMI operator can perform an operation for scaling up or down the size so as to be easily viewable.

Although the embodiments of the present disclosure have been described above, the present disclosure is not limited to the above-described embodiments, and can be implemented with various modifications without departing from the spirit of the present disclosure.

REFERENCE SIGNS LIST

1 drawing generation device
11 drawing editor
12 drafting unit
13 part runtime attribute generation unit
14 HMI drawing data output unit
2 HMI drawing data
21 SVG data
22 part runtime attribute data
3 HMI
31 HMI server device
311 HMI server runtime
32 HMI terminal device
321 Web browser
322 HMI Web runtime
4 monitoring control system
5 communication infrastructure
6 RIO
7 monitoring target device
121 stencil area
121*a* to 121*h* prototype of part
122 drafting area
122*a*-122*h* part arranged on drawing in drafting area
322*a* part unique processing unit
322*b* part management information
322*c* SVG data reading processing unit
322*d* signal data receiving unit 322e drawing updating unit
322f event processing unit
322g control command transmitting unit
8a to 8k part unique processing
1a, 31a, 32a processor
1b, 31b, 32b memory
1c, 32c display
1d input/output interface
31d network interface
32d input interface
71 header drawing
72 main drawing
73 footer drawing
74 layout drawing
131 button part
132 new window

The invention claimed is:

1. A SCADA Web HMI system comprising: a drawing generation device capable of generating a drawing where parts are arranged; and an HMI terminal device connected to a monitoring target device and displaying a state of the monitoring target device,
the drawing generation device including:
a drafting unit displaying a stencil area where parts are arranged and a drafting area where a drawing is drawn, the drafting unit being capable of arranging selected parts in the stencil area on the drawing in the drafting area;
a part runtime attribute generation unit automatically generating part runtime attribute data that associates unique names associating the parts arranged on the drawing in the drafting area with the monitoring target device, with dynamic display contents of the parts depending on change in signal data from the monitoring target device; and
an HMI drawing data output unit outputting vector data of the drawing where the parts drawn in the drafting area are arranged, and the part runtime attribute data,
the HMI terminal device including:
a Web browser that reads at least one piece of the vector data and displays an HMI screen; and
an HMI web runtime that reads the part runtime attribute data as setting parameters and operates on the Web browser, and
the HMI Web runtime associating the parts with the monitoring target device in accordance with the setting parameters, and when receiving signal data corresponding to the unique names from the monitoring target device, the HMI Web runtime changing display of the parts corresponding to the unique names, on the HMI screen.

2. The SCADA Web HMI system according to claim 1, wherein
the HMI screen is configured by a plurality of areas, and the vector data of the drawing generated by the drawing generation device is arranged in each area, and
the Web browser resizes a drawing to be displayed in each area configuring the HMI screen so that a long side or a short side of the drawing is inscribed in an area frame and the entire drawing is arranged within the area while an aspect ratio is fixed, where each drawing is generated by the drawing generation device so as to be resized at the same magnification n.

3. The SCADA Web HMI system according to claim 2, wherein
the vector data is Scalable Vector Graphics (SVG) format data, and
when vpw is defined as the number of horizontal pixels of viewport of the area, vph is defined as the number of vertical pixels of viewport of the area, vbw is defined as the number of horizontal pixels of viewbox of the drawing, and vbh is defined as the number of vertical pixels of viewbox of the drawing, the same magnification n is n=min (vpw/vbw, vph/vbh).

4. The SCADA Web HMI system according to claim 1, wherein
when a button part to open a new window on the HMI screen is pressed, the HMI Web runtime displays the new window at a relative position specified by a unit of inches or millimeters from a display position of the button part.

5. A SCADA Web HMI system comprising: a drawing generation device capable of generating a drawing where parts are arranged; and an HMI terminal device connected to a monitoring target device and displaying a state of the monitoring target device,
the drawing generation device including:
a first display;
a first processor executing a program; and
a first memory that stores a program executing, when being executed by the first processor, processing of
displaying a stencil area where parts are arranged and a drafting area where a drawing is drawn on the first display,
arranging selected parts on the stencil area, on the drawing in the drafting area,
when the parts are arranged on the drawing in the drafting area, automatically generating part runtime attribute data that associates unique names associating the parts with the monitoring target device, with dynamic display contents of the parts depending on change in signal data from the monitoring target device, and
outputting vector data of the drawing where the parts drawn in the drafting area are arranged, and the part runtime attribute data, and
the HMI terminal device including:
a second display displaying a Web browser;
a second processor executing a program; and
a second memory that stores a program executing, when being executed by the second processor, processing of
reading at least one piece of the vector data and displaying an HMI screen on the Web browser,
reading the part runtime attribute data as setting parameters when executing the Web browser,
associating the parts with the monitoring target device in accordance with the setting parameters, and
when receiving signal data corresponding to the unique names from the monitoring target device, changing display of the parts corresponding to the unique names in accordance with the setting parameters, on the HMI screen displayed on the second display.

6. The SCADA Web HMI system according to claim 5, wherein
the HMI screen is configured by a plurality of areas, and the vector data of the drawing generated by the drawing generation device is arranged in each area, and
the Web browser resizes a drawing to be displayed in each area configuring the HMI screen so that a long side or a short side of the drawing is inscribed in an area frame and the entire drawing is arranged within the area while an aspect ratio is fixed, where each drawing is generated by the drawing generation device so as to be resized at the same magnification.

7. The SCADA Web HMI system according to claim 6, wherein
the vector data is Scalable Vector Graphics (SVG) format data, and when vpw is defined as the number of horizontal pixels of viewport of the area, vph is defined as the number of vertical pixels of viewport of the area, vbw is defined as the number of horizontal pixels of viewbox of the drawing, and vbh is defined as the number of vertical pixels of viewbox of the drawing, the same magnification n is n=min (vpw/vbw, vph/vbh).

8. The SCADA Web HMI system according to claim 5, wherein
the second memory further stores a program executing, when a button part to open a new window on the HMI screen is pressed, processing of displaying the new window at a relative position specified by a unit of inches or millimeters from a display position of the button part.

* * * * *